United States Patent
Schaumburg

(10) Patent No.: US 9,457,964 B2
(45) Date of Patent: Oct. 4, 2016

(54) SEPARATING DEVICE

(71) Applicant: Robert Bosch GmbH, Stuttgart (DE)

(72) Inventor: Uwe Schaumburg, Beringen (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/350,669

(22) PCT Filed: Sep. 21, 2012

(86) PCT No.: PCT/EP2012/068700
§ 371 (c)(1),
(2) Date: Apr. 9, 2014

(87) PCT Pub. No.: WO2013/053584
PCT Pub. Date: Apr. 18, 2013

(65) Prior Publication Data
US 2014/0251758 A1    Sep. 11, 2014

(30) Foreign Application Priority Data
Oct. 13, 2011    (DE) .................... 10 2011 084 469

(51) Int. Cl.
| | |
|---|---|
| *B65G 23/14* | (2006.01) |
| *B65G 47/26* | (2006.01) |
| *B65G 47/52* | (2006.01) |
| *B65G 15/00* | (2006.01) |
| *B65B 23/14* | (2006.01) |
| *B65G 47/08* | (2006.01) |

(52) U.S. Cl.
CPC ............. *B65G 47/261* (2013.01); *B65B 23/14* (2013.01); *B65G 47/084* (2013.01); *B65G 47/26* (2013.01)

(58) Field of Classification Search
None
See application file for complete search history.

(56) References Cited

U.S. PATENT DOCUMENTS

| | | | |
|---|---|---|---|
| 3,930,572 A | 1/1976 | Fluck et al. | |
| 4,209,960 A | 7/1980 | Deutschlander et al. | |
| 4,611,705 A | 9/1986 | Fluck | |
| 4,832,167 A | 5/1989 | Fluck | |
| 5,358,232 A | 10/1994 | Arendes et al. | |
| 6,793,064 B2* | 9/2004 | Schoeneck | B65B 21/06 198/418.7 |

(Continued)

FOREIGN PATENT DOCUMENTS

| | | |
|---|---|---|
| DE | 7223053 | 9/1972 |
| EP | 1982919 | 10/2008 |

(Continued)

OTHER PUBLICATIONS

International Search Report for Application No. PCT/EP2012/068700 dated Dec. 20, 2012 (English Translation, 3 pages).

*Primary Examiner* — Kavel Singh
(74) *Attorney, Agent, or Firm* — Michael Best & Friedrich LLP

(57) ABSTRACT

The invention proceeds from a separating device having at least one portioning unit (12*a-f*) which is provided for spacing main groups (14*a-f*) apart from at least one product column (18*a-f*) which is fed in a continuous feed movement (16*a-f*) and for forming the main groups (14*a-f*) from the at least one product column (18*a-f*) which is fed in, by an acceleration at least substantially in the direction of the feed movement (16*a-f*). It is proposed that the portioning unit (12*a-f*) is provided for returning into an initial position (20*a-f*) in order to form the next main group (14*a-f*), while the at least one product column (18*a-f*) which is fed in a feed movement (16*a-f*).

21 Claims, 6 Drawing Sheets

(56) References Cited

U.S. PATENT DOCUMENTS

| | | | |
|---|---|---|---|
| 6,968,937 B2 * | 11/2005 | Mader | B65H 29/02 198/419.1 |
| 6,971,839 B2 * | 12/2005 | Cerutti | B65B 23/14 198/418.6 |
| 7,815,034 B2 * | 10/2010 | Fleck | B65B 35/405 198/418.7 |
| 2003/0098219 A1 | 5/2003 | Mader et al. | |
| 2003/0136641 A1 | 7/2003 | Iwasa et al. | |
| 2004/0065214 A1 | 4/2004 | Muri et al. | |
| 2008/0099307 A1 | 5/2008 | Fleck et al. | |

FOREIGN PATENT DOCUMENTS

| | | |
|---|---|---|
| FR | 2620689 | 3/1989 |
| GB | 199812 | 7/1970 |

* cited by examiner

SEPARATING DEVICE

BACKGROUND OF THE INVENTION

Separating devices having at least one portioning unit, which is designed to space main groups from at least one product column supplied in a continuous feed motion and to form the main groups from the at least one supplied product column by an acceleration at least substantially in the direction of the feed motion, are already known.

SUMMARY OF THE INVENTION

The invention is based on a separating device having at least one portioning unit, which is designed to space main groups from at least one product column supplied in a continuous feed motion and to form the main groups from the at least one supplied product column by an acceleration at least substantially in the direction of the feed motion.

It is proposed that the portioning unit is designed to return into a starting position in order to form the next main group, while the at least one supplied product column is supplied in a feed motion. By a "separating device" should in this context be understood, in particular, a device for a packing machine, which is designed to form from at least one supplied product column product groups to be packed and to forward these to the packing machine. The separating device can, however, also be designed to separate product columns in other applications which appear sensible to a person skilled in the art. By a "portioning unit" should in this context be understood, in particular, a unit which is designed to form at least one separated product group from at least one product column supplied to the separating device. By a "main group" should in this context be understood, in particular, a group of products, or a plurality of subgroups of products, which are formed in a separation cycle by the portioning unit and/or which are designed to be jointly packed by the packing machine. Preferably, a main group has a length of between 45 mm and 350 mm. A main group and/or a subgroup can preferably consist of more than 5 and less than 25 products. By a "separation cycle" should in this context be understood, in particular, a repeating motional cycle of the separating unit, which serves to separate and forward a main group of each supplied product column. By a "product column" should in this context be understood a quantity of products which consists of, in particular, a stack of strung, mutually touching individual products. One or more product columns can be fed to the separating device. Preferably, in the case of a plurality of supplied product columns, for each product column a portioning unit, assigned to this product column, is respectively provided to form main groups from this product column. Preferably, the products are flat, particularly preferably disk-shaped products, in particular biscuits. By "disk-shaped" should in this context be understood, in particular, a body form which has at least substantially two faces, a thickness and an edge. By "flat" should in this context be understood, in particular, that the thickness of the product is at least smaller than the other extents of the product. Preferably a diameter of the product, measured perpendicular to the thickness, is in all directions at least twice as large as the thickness of the product. The edge can be at least approximate to the shape of a polygon, preferably a triangle or a square, or, in particular, to that of a circle. By "at least approximate" should in this context be understood, in particular, that the form of the edge deviates from the shape to which it approximates, measured in particular perpendicular to the thickness of the product, preferably by less than 25%, particularly preferably by less than 10%, in relation to a largest product diameter. Other products which can be arranged in a stack in a product column are also conceivable, however. Preferably, the products are stacked in the direction of their smallest product dimension. The product column can be arranged vertically. Preferably, the product column is arranged horizontally or at an angle to a horizontal. The supplied product column can be borne by a transport device familiar to the person skilled in the art, in particular by a chute. The product column can be transported in the feed motion by the use of various methods familiar to the person skilled in the art, such as, for example, by moving conveyors and/or belts in positive or non-positive engagement with the products, by gravitational force and, in particular, by vibration of the transport device. Preferably, the products are arranged on the transport device standing on their edges. The products are preferably stacked in the feed direction. The products can preferably assume a shingled configuration. By a "shingled" configuration should be understood, in particular, that the products are arranged in the product column inclined in the direction, or, particularly preferably, counter to the direction of the feed motion. By a "continuous" feed motion should in this context be understood, in particular, that the product column is supplied in a perpetual motion. A supply speed in the feed direction can here be variable. Changes of speed are preferably smooth. In particular, the portioning unit should be able to form the main groups from the supplied product column, while the product column is supplied in a feed motion. In particular, the product column should be able to be supplied during the separation of a main group without interruption in the feed motion. Preferably, the portioning unit should be able to form the main groups from the supplied product column even in case of an interruption of the continuous feed motion. An interruption of the continuous feed motion can arise, for example, if the product supply stops. In case of an interrupted feed motion, the portioning unit can, in particular, complete a started separation cycle and/or form a main group if sufficient products are available. By an acceleration at least "substantially" in the direction of the feed motion should in this context be understood, in particular, that the portioning unit accelerates the main group, for the spacing from the product column, in a direction which deviates by less than 45°, preferably by less than 10°, particularly preferably by less than 20°, from the feed direction. By a "starting position" should in this context be understood, in particular, a position of the portioning unit from which a separation cycle for separating a main group is started. The length of time of a separation cycle is preferably shorter than the length of time which is needed to supply a product stack corresponding to the product quantity of a main group. If the length of time is shorter, the portioning unit, prior to the start of a next separation cycle, waits preferably until the product quantity of a main group is available again. Starting from the position at which the main group is separated from the product column, the portioning unit spaces the main group preferably at least by a distance which, up to the point of onward transport of the separated main group, corresponds at least to the product column length supplied with the feed motion. Preferably, the portioning unit, starting from the position at which the main group is separated from the product column, spaces the main group by a distance which corresponds at least to half the length of a main group, particularly preferably to no more than one main group length. The portioning unit can transport the main group directly to an onward transport unit. By an "onward transport unit" should in this context be understood, in particular, a transport unit which moves the main group away from the separation unit and preferably takes it to a next machining process, in particular a packing process. In particular, the onward transport unit can be a chain, such as, for example, a feed chain or cross chain. By a "chain" should in this context be understood, in particular, a transport device which has discrete set-down positions for the reception of products. The feed motion can be maintained throughout the separation cycle. A pile-up of the product column can be avoided. Space for stowing the product column during stoppage of the feed motion can be saved. An increased dynamic pressure as a result of pile-up of the product column can be avoided. Damage to the products as a result of the dynamic pressure and/or increased friction between the products can be avoided. The products can be treated gently. The next main group can be fed to the separating unit, while the portioning unit spaces the previous main group. The output of the separating unit can be increased. In particular, it can be possible with a portioning unit to separate up to 50 main groups per minute from a product column. A single portioning unit can be used to form the main groups from a supplied product column. Further portioning units can be saved. The separation unit can be particularly compact. Costs can be saved.

A depositing unit, which is designed to evacuate the main groups in an evacuation motion having a motional component at least substantially transversely to the feed motion, is also proposed. By a "depositing unit" should in this context be understood, in particular, a unit which is designed to deposit the main group on or in the onward transport unit. The onward transport unit can be, in particular, a cross chain of the packing machine. The depositing unit can be a constituent part of the onward transport unit. In particular, divisions of an onward transport unit configured as a transport chain can be designed to evacuate the main groups in an evacuation motion having a motional component at least substantially transversely to the feed motion. By an "evacuation motion" should in this context be understood, in particular, that motion with which the main group is transferred to the onward transport unit. By "substantially transversely" should in this context be understood, in particular, that the main group, during the evacuation motion, covers the greatest distance in the direction transversely to the feed motion. If the main group has a smaller length in the direction transversely to the feed motion than in the direction of the feed motion, the main group can be evacuated transversely at a lower speed than in an evacuation in the direction of the feed motion. The separating unit can be particularly compact. The main group can be shunted sideways in an evacuation motion, in a direction transversely to the feed motion. Preferably, the main group can be deposited downward in an evacuation motion in a direction transversely to the feed motion. With the aid of gravitational force, the main group can make its way into the onward transport unit located below the depositing unit. The depositing unit can be designed as a bucket on which the main group rests. Preferably, the depositing unit can be configured as a two-part bucket and can be opened on a bottom side. The main group can be transferred particularly quickly to an onward transport unit arranged below the depositing unit.

In a further embodiment of the invention, it is proposed that the depositing unit and/or the positioning unit is/are designed to deposit the main groups in synchronization with an onward transport motion into an onward transport unit. Preferably, the portioning unit can be designed to deposit the main groups in synchronization with the onward transport motion. Particularly preferably, the depositing unit and the portioning unit can be formed by an assembly which, at least in the direction of the feed motion, is moved as one. The evacuation motion can be formed by a motion at least substantially in the direction of the onward transport motion. Preferably, the evacuation motion can contain a motional component at least substantially transversely to the feed motion, as well as a further motional component at least substantially in the direction of and synchronous with the onward transport motion. The onward transport unit can be moved in a continuous onward transport motion. In particular, the onward transport unit does not have to be stopped for the depositing of the main groups. If the onward transport direction is arranged at least substantially transversely to the feed motion, the motional component, arranged at least substantially transversely to the feed motion, of the evacuation device can be synchronized with the onward transport unit. For a synchronization of the main group with the onward transport unit, the evacuation motion can also be superimposed by a further motional component. If the onward transport motion is arranged at least substantially in the direction of the feed motion, a motion of the depositing unit substantially in the direction of the feed direction can, in particular, be designed to synchronize the main product group with the onward transport motion.

Preferably, the portioning unit is designed to at least substantially stop the main groups prior to the start of the evacuation motion. In particular, the portioning unit can be designed to stop the main group while the supplied product column is supplied in the feed motion. The main group can advantageously be prepared for the evacuation motion, in particular for an evacuation motion transversely to the feed motion. A particularly gentle evacuation motion can take place. Damage to the products can be avoided. A reduction in output as a result of stoppage of the feed motion can be avoided.

In addition, a product column brace, which is synchronizable with the feed motion and which is designed to, at least during the spacing and/or evacuation of the main groups, to secure one end of the supplied product column, is proposed. In particular, the product column brace can prevent, in particular, the (in the direction of the feed motion) last products of the product column from tipping over. After the main group has been separated from the portioning unit, the product column brace can be placed against the end of the product column and secure this end. The product column brace is moved jointly with the continuous feed motion of the product column. The product column brace can be jointly moved as a result of the dynamic pressure of the product column. Preferably, the product column brace is actively moved jointly with the product column by a drive mechanism. An increased force influence on the product column can be avoided. A particularly gentle securement of the product column can be achieved.

In a further embodiment of the invention, a feed unit, which is designed to feed the supplied product column in a feed direction which is angled downward in relation to a horizontal, is proposed. If the feed unit is angled downward, the product column, as a result of the weight of the products forming the product column, can be accelerated in the direction of the feed motion. Preferably, the feed unit is configured as a chute or as a shaft. Preferably, the feed direction is angled downward by an angle of more than 10°, particularly preferably of more than 30°, in relation to the horizontal. In particular, the feed direction can be angled downward by an angle of between 30° and 45°. The weight acting on the product column can boost the acceleration by the portioning unit. In order to separate the main group by an acceleration in the direction of the feed motion, the positioning unit has only to apply to the main product group a minor additional force in the direction of the feed motion. The main group can be accelerated particularly gently. Damage to products can be avoided.

In a further advantageous variant of the invention, the separating device can contain a feed unit, which is designed to feed the supplied product column in a feed direction which is angled upward in relation to a horizontal. If the feed unit is angled upward, the product column can be stabilized by the weight acting on the product column. In particular, a tipping of the last products of the product column can be prevented. Preferably, the feed unit is configured as a chute or as a shaft. Preferably, the feed direction is angled upward by an angle of more than 10°, particularly preferably of more than 30°, in relation to the horizontal. In particular, the feed direction can be angled upward by an angle of between 30° and 45°. A product column brace can be dispensed with. Costs can be saved. The separating device can be of particularly simple construction.

In addition, at least one separating element and a group brace, between which the main groups and/or subgroups are formed, are proposed. By a "separating element" should in this context be understood, in particular, a flat, preferably sword-like element, in particular a separating sword. At a separating position, the separating element can be pushed between two products of the product column and can thus at this position separate these into main groups or subgroups. By a "group brace" should in this context be understood, in particular, an element which, before or during the separation of a main group, is placed against that end of the product column which lies in the direction of the feed motion, and hence secures that end of the main product group which lies in the direction of the feed motion. If the portioning unit is designed to form a main group consisting of a plurality of subgroups, further separating elements can be provided in order to separate the subgroups within the main group. The separating elements can be designed to increase a distance apart of the subgroups. Preferably, the separating elements can be mounted movably, in particular displaceably, relative to one another in order, after the formation of the subgroups, to increase the distance apart of the subgroups. In particular, subgroups can be formed by at least two separating elements, at one position, being pushed into the product column, which separating elements are then spaced apart and thus increase the distance apart of the subgroups. The groups can be separated easily and effectively from the product column. For the separation of the main product group from the product column, separating elements and group braces can preferably be introduced between products of the product column in a motional component oriented at least substantially transversely to the direction of the feed motion. Onto this motional component is preferably superimposed a second motional component synchronized with the feed motion. In particular, the portioning unit with separating elements and group braces can be moved in synchronization with the feed motion. A separation which is gentle on the product is possible. An influencing of the continuous feed motion of the product column by the portioning unit can be avoided. The continuous feed motion can be uninterrupted.

Advantageously, a main group length and/or a subgroup length are/is determined by distances between separating elements and/or between the separating element and the group brace. The separating unit can form a "measuring inlay". By a "measuring inlay" should in this context be understood, in particular, a separating unit which forms main groups and/or subgroups of equal length. The distances between the separating elements and/or between the separating element and the group brace can be adjustable. A main group and/or subgroups of a desired length can be separated particularly easily. It is also conceivable for the portioning units to be designed to form main groups and/or subgroups consisting of a constant product number. A constant product number can be ensured by measures known to the person skilled in the art. A constant number of products in a main group and/or subgroup can be ensured.

Particularly advantageously, a packing machine contains the separating device according to the invention. By a "packing machine" should in this context be understood, in particular, a packing machine which is designed for the packing of foods, in particular biscuits. In particular, the packing machine can be designed to pack one or more biscuit stacks, known as "slugs", into a tubular bag pack or a roll pack. The biscuit stacks can be formed by a main group or by subgroups of the main group. Preferably, the separating unit can be designed to form main groups corresponding to those groups of the packing which are to be packed in one step. A particularly compact, efficient and cost-effective packing machine having the stated advantages can be achieved.

In addition, a method for forming main groups with a separating device according to the invention is proposed. The separating device can be operated particularly efficiently and economically in the described manner.

BRIEF DESCRIPTION OF THE DRAWINGS

Further advantages emerge from the following drawing description. In the drawing, illustrative embodiments of the invention are represented. The drawing, the description and the claims contain numerous features in combination. The person skilled in the art will expediently also view the features individually and group them into sensible further combinations.

DETAILED DESCRIPTION

Figure 1:
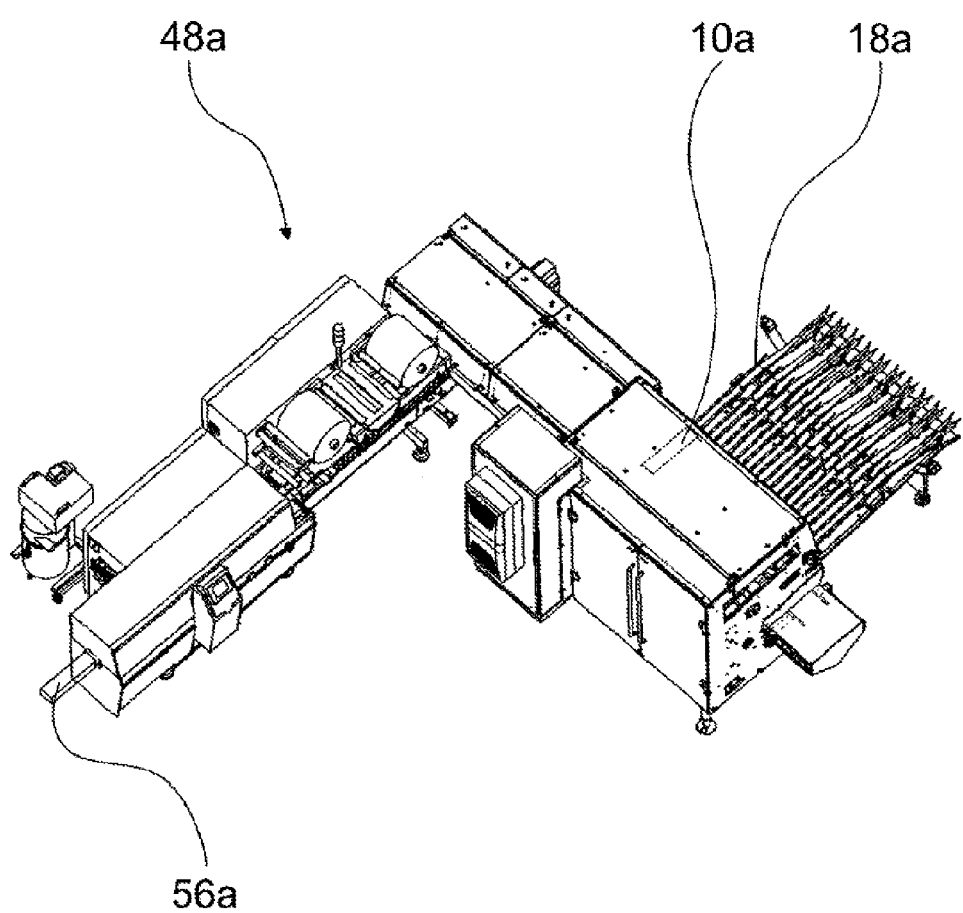
FIG. 1 shows a schematic representation of a packing plant having a separating device according to the invention.
Figure 2:
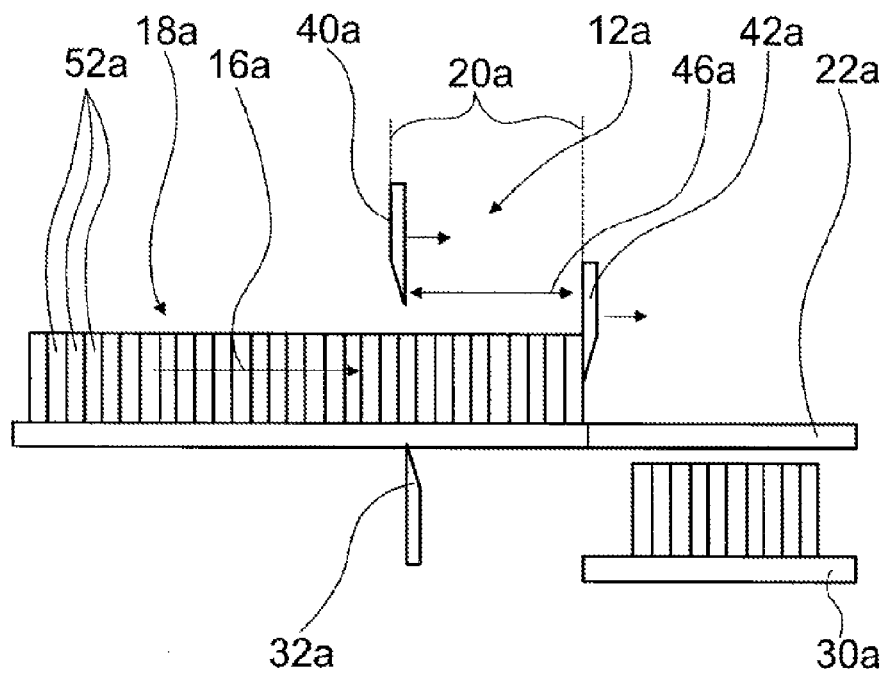
FIG. 2 shows a schematic representation of the separating device at the start of a separating operation.

FIG. 1 shows a packing plant 48a for packing biscuits stacks, known as slugs 50a, comprising a separating device 10a according to the invention. The packing plant 48a is supplied with products 52a, configured as biscuits, in a plurality of product columns 18a. Following the packing, the packed slugs 50a leave the packing plant 48a on an outfeed conveyor 56a. The packing plant 48a contains, for each product column 18a supplied to it, a separating device 10a having a portioning unit 12a, which spaces main groups 14a from the product column 18a supplied in a continuous feed motion 16a and which forms main groups 14a from the supplied product column 18a by an acceleration at least substantially in the direction of the feed motion 16a. The separating devices 10a with the portioning units 12a are synchronously driven by drive mechanisms (not represented in detail). The drive mechanisms can be synchronized mechanically, for example by a transmission device, or preferably electrically, in particular by a control and regulating unit. It is also possible, however, to drive the separating devices 10a separately. The portioning unit 12a returns into a starting position 20a in order to form the next main group 14a while the supplied product column 18a is supplied in a feed motion 16a (FIG. 2 and FIG. 3).

Figure 3:
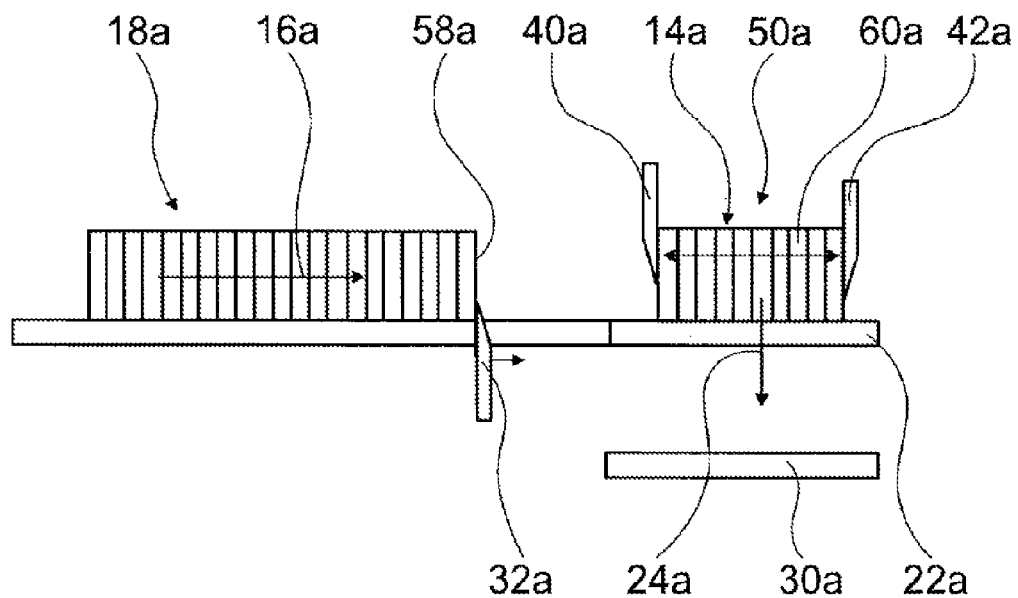
FIG. 3 shows a schematic representation of the separating device with a spaced main group.
Figure 4:
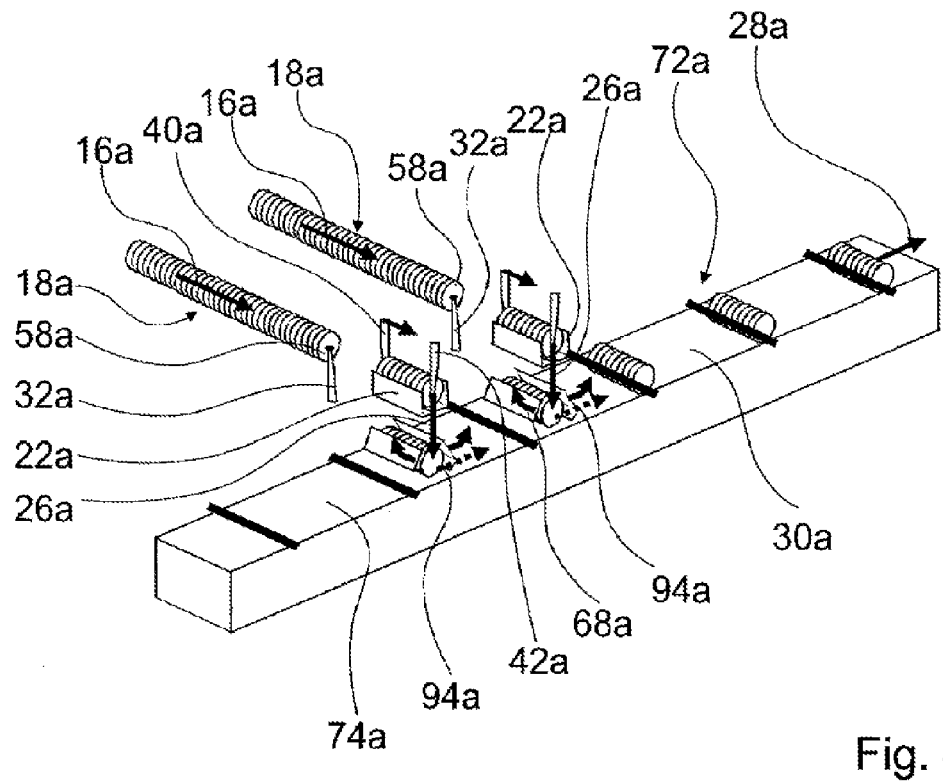
FIG. 4 shows a schematic representation of the separating device with an onward transport unit.

Following the spacing from a depositing unit 22a, the main group 14a is evacuated from the separating device 10a in an evacuation motion 24a having a motional component 26a arranged substantially transversely to the feed motion 16a (FIG. 3 and FIG. 4). The portioning unit 12a stops the main groups 14a prior to the start of the evacuation motion 24a. During the spacing and the evacuation of the main groups 14a, a product column brace 32a synchronizable with the feed motion 16a secures a free end 58a, lying in the direction of the feed motion 16a, of the supplied product column 18a.

The main groups 14a are formed by the portioning unit 12a between a separating element 40a and a group brace 42a. The separating device 10a is configured as a so-called measuring inlay, that is to say it forms main groups 14a having a constant main group length 60a. A distance 46a between the separating element 40a and the group brace 42a determines the main group length 60a of the separated main group 14a.

The separated main group 14a rests on the depositing unit 22a, which deposits the main group 14a downward on an onward transport unit 30a in the evacuation motion 24a. In this example, the packing plant 48a has two separating devices 10a, to which a product column 18a is respectively fed. The depositing unit 22a is configured, in a manner known to the person skilled in the art, as a two-part bucket 68a. The depositing unit 22a is firstly moved with a motional component 26a of the evacuation motion 24a transversely to the feed motion 16a downward in the direction of the onward transport unit 30a. The onward transport unit 30a is configured as a cross chain 72a having discrete set-down positions 74a. If the set-down position 74a provided for the main group 14a is located below the depositing unit 22a, the two-part bucket 68a opens, so that the main group 14a, as a result of the weight, rests on the set-down position 74a of the onward transport unit 30a. Optionally, the depositing unit 22a can deposit the main group 14a with a further motional component 94a in synchronization with an onward transport motion 28a of the onward transport unit 30a. The onward transport unit 30a feeds the main group 14a to a packing process (not represented in detail here), while the portioning unit 12a returns into a starting position 20a in order to form the next main group 14a.

The following description and the drawing of further illustrative embodiments are substantially confined to the differences between the illustrative embodiments, wherein, with respect to identically labeled parts, in particular in relation to parts having the same reference symbols, reference can basically also be made to the drawings and/or the description of the other illustrative embodiment. In order to differentiate between the illustrative embodiments, in place of the letter a of the first illustrative embodiments, the letters b, c, d, e and f are placed after the reference symbols of the further illustrative embodiments.

Figure 5:
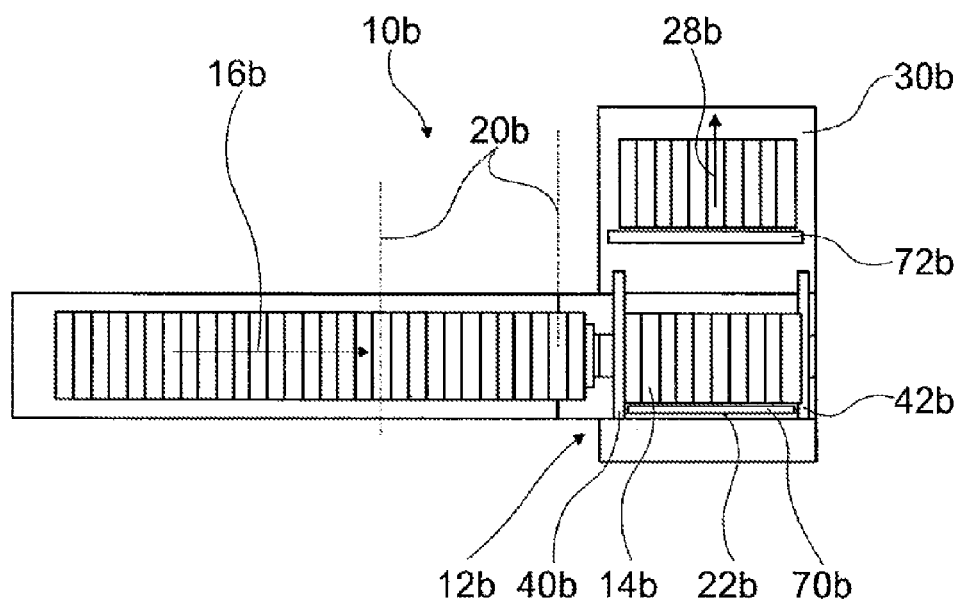
FIG. 5 shows a schematic representation of a separating device in a second illustrative embodiment.

FIG. 5 shows a separating device 10b in a second illustrative embodiment. The separating device 10b differs from the first illustrative embodiment in that a main group 14b, following the separation by a portioning unit 12b, is shunted by a depositing unit 22b, configured as a pusher 70b, in an evacuation motion 24b transversely to a feed motion 16b horizontally into an onward transport unit 30b. The onward transport unit 30b feeds the main group 14b also to a packing process (not represented in detail here), while the portioning unit 12b returns into a starting position 20b in order to form the next main group 14b. The function of the pusher 70b can likewise be performed by divisions of the onward transport unit 30b. If the onward transport unit 30b is configured as a cross chain 72b, the main group 14b, following the separation by the portioning unit 12b, can be pushed between two divisions of the cross chain 72b, whereupon the cross chain 72b evacuates the main group 14b in the evacuation motion 24b transversely to the feed motion 16b.

Figure 6:
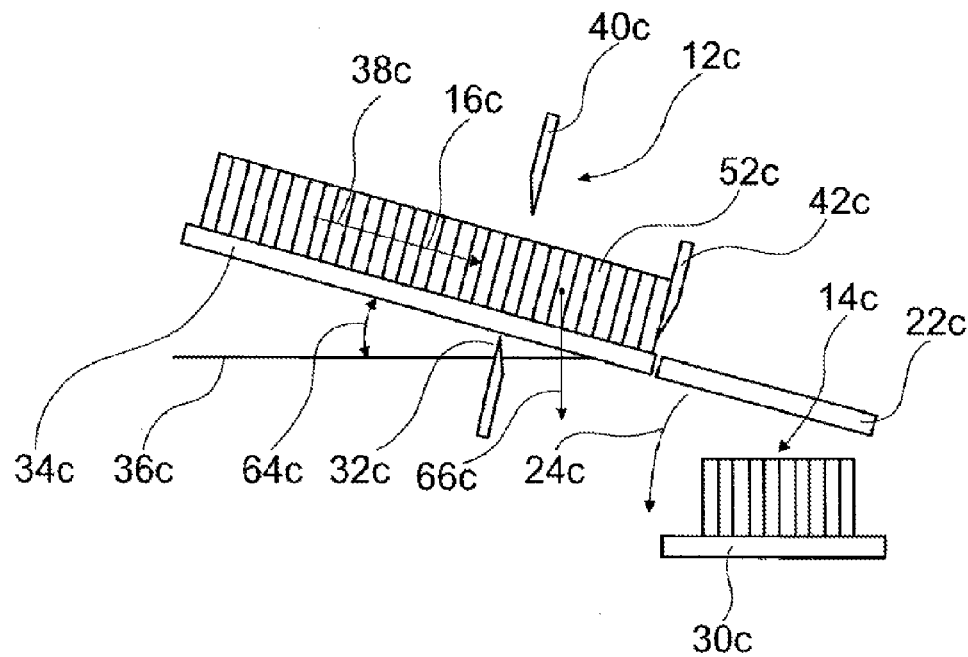
FIG. 6 shows a schematic representation of a separating device in a starting position in a third illustrative embodiment.

FIG. 6 shows a separating device 10c in a third illustrative embodiment. The separating device 10c differs from the first illustrative embodiment by virtue of a feed unit 34c, which is designed to feed a supplied product column 18c in a feed direction 38c which is angled downward in relation to a horizontal 36c. The feed unit 34c is angled downward by an angle 64c of between 20° and 30° in relation to the horizontal 36c. A weight 66c acting on the product column 18c produces an acceleration of the product column 18c in the feed direction 38c. A portioning unit 12c has therefore only to apply only a minor force to a main group 14c in order to separate this in the direction of a feed motion 16c. Products 52c of the main group 14c can be treated gently and damage is avoided. Following the separation, the main group 14c is deposited by a depositing unit 22c, in an evacuation motion 24c configured as a pivot motion, on a horizontally arranged onward transport unit 30c.

Figure 7:
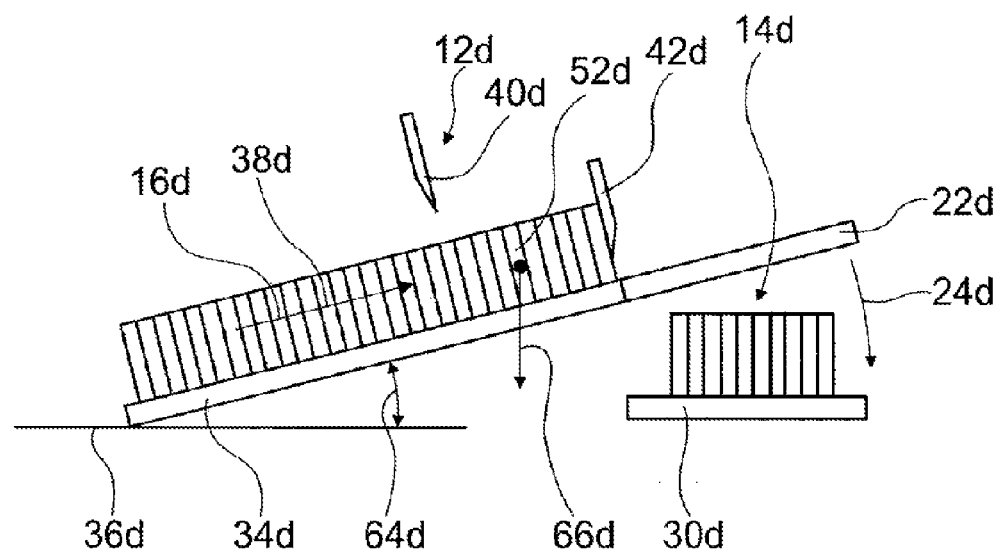
FIG. 7 shows a schematic representation of a separating device with a spaced main group in a fourth illustrative embodiment.

FIG. 7 shows a separating device 10d in a fourth illustrative embodiment. The separating device 10d differs from the first illustrative embodiment by virtue of a feed unit 34d, which is designed to feed a supplied product column 18d in a feed direction 38d which is angled upward in relation to a horizontal 36d. The feed unit 34d is angled upward by an angle 64d of between 20° and 30° in relation to the horizontal 36d. A weight 66d acting on the product column 18d causes the products 52d at a free end 58d of the product column 18d to rest on the underlying products 52d. A product column brace as in the preceding illustrative embodiments, which stabilizes the last products 52d of the end 58d of the product column 18d, can therefore be dispensed with. Following the separation, a main group 14d is deposited by a depositing unit 22d, in an evacuation motion 24d configured as a pivot motion, on a horizontally arranged onward transport unit 30d.

Figure 8:
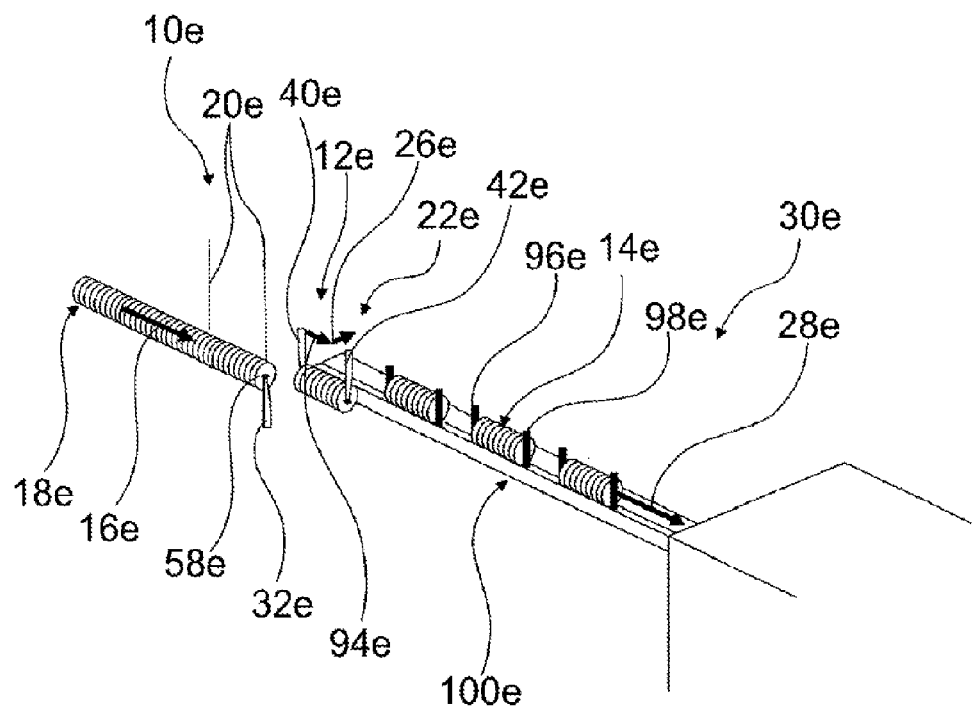
FIG. 8 shows a schematic representation of a separating device in a fifth illustrative embodiment.

FIG. 8 shows a separating device 10e in a fifth illustrative embodiment. The separating device 10e differs from the first illustrative embodiment in that a portioning unit 12e and a depositing unit 22e deposit main groups 14e, in synchronization with an onward transport motion 28e, into an onward transport unit 30e. In this example, the depositing unit 22e is formed directly by the portioning unit 12e. The onward transport unit 30e is configured as a feed chain 100e having discrete set-down positions 74e of a packing plant 48e and moves in the onward transport motion 28e synchronized with a packing process. The feed chain 100e has dogs 96e and braces 98e, between which the deposited main groups 14e are transported. The onward transport motion 28e is oriented in the direction of a feed motion 16e. The portioning unit 12e firstly spaces a main group 14e by an acceleration in the direction of the feed motion 16e and pushes the separated main group 14e, with a motional component 26e oriented transversely to the feed motion 16e, in the direction of the onward transport unit 30e. The portioning unit 12e superimposes onto this motional component 26e a further motional component 94e in the direction of the onward transport motion 28e, such that, when the main group 14e is deposited in the set-down position 74e of the onward transport unit 30e, the motions of the main group 14e and of the onward transport unit 30e in the direction of the onward transport motion 28e are synchronous. The portioning unit 12e then returns into a starting position 20e in order to form the next main group 14e. A product column brace 32e, which is moved synchronously with the feed motion 16e, secures an end 58e of a product column 18e for the period in which it is not secured by a group brace 42e.

Figure 9:
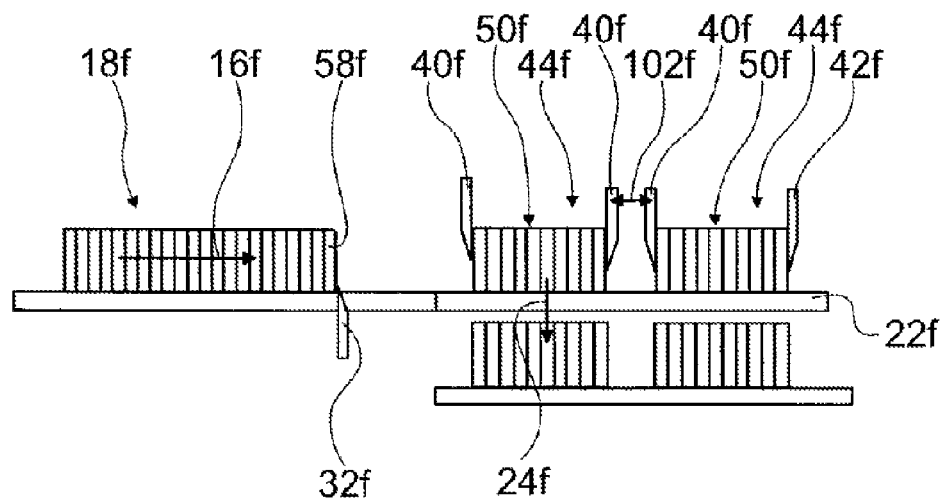
FIG. 9 shows a schematic representation of a separating device in a sixth illustrative embodiment.
Figure 10:
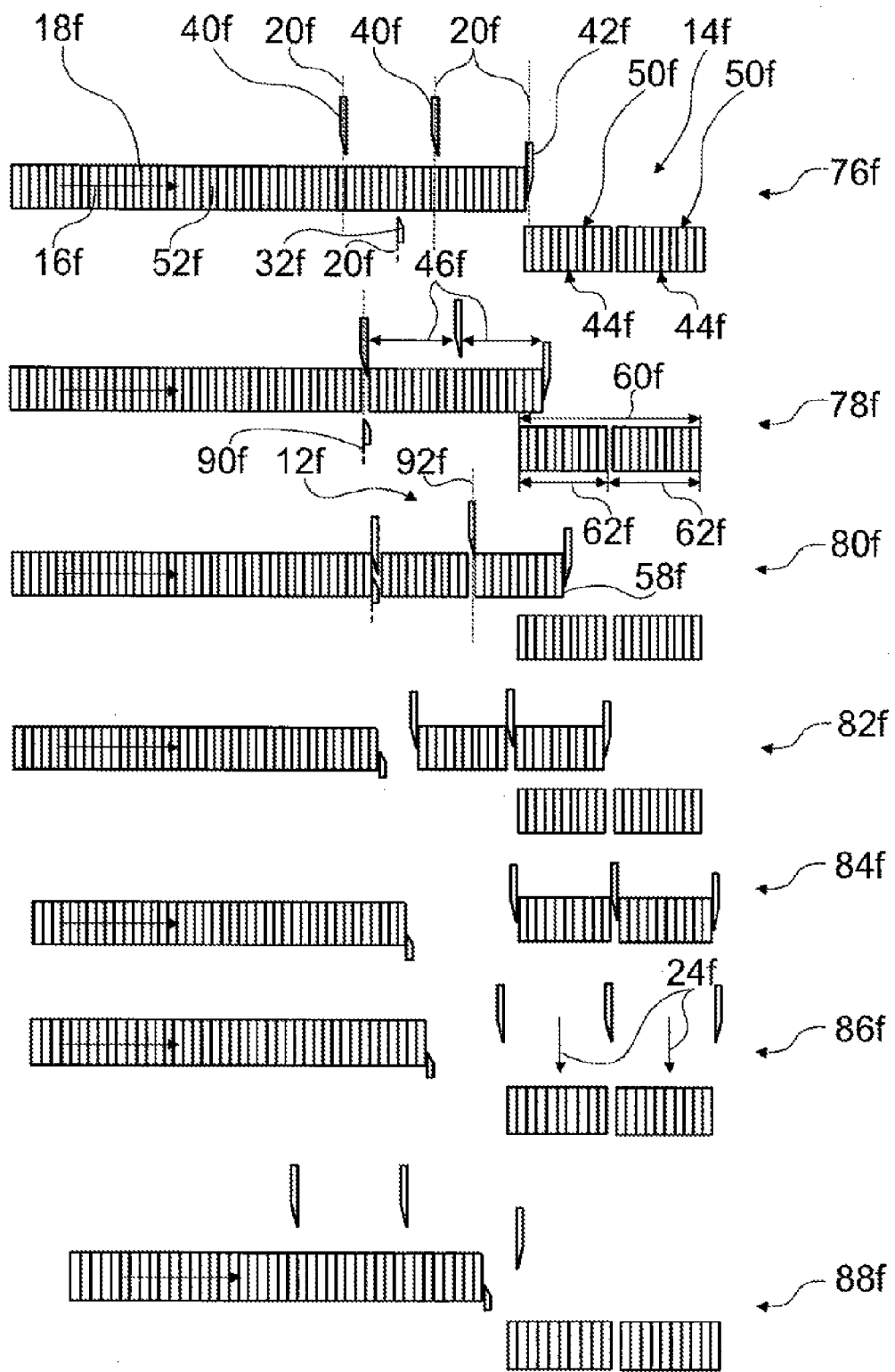
FIG. 10 shows a schematic representation of a separation cycle with a separating device in a sixth illustrative embodiment.

FIG. 9 and FIG. 10 show a method for forming main groups 14f from a product column 18f with a separating device 10f in a further illustrative embodiment. This method is likewise applicable, with adaptation, to the separating devices 10a-10e of the further illustrative embodiments. The separating device 10f differs from the first illustrative embodiment in that it forms main groups 14f consisting of a plurality of subgroups 44f. In the shown example, two equally long subgroups 44f form a main group 14f. A packing plant 48f can produce packs, for instance, having respectively two slugs 50f consisting of a subgroup 44f. The main groups 14f, consisting of the subgroups 44f, are formed between the separating elements 40f and the group brace 42f. A portioning unit 12f for forming a main group 14f, consisting of two subgroups 44f, contains in total three separating elements 40f and a group brace 42f. The distance between the two subgroups 44f is greater than a width of the separating elements 40f. The subgroups 44f are formed by the insertion of two separating elements 40f, configured as a separating sword, at the parting position 92f. These two separating elements 40f are mounted movably relative to each other and, following the formation of the subgroups 44f, are spaced in a motion 102f in order thus to increase the distance between the two subgroups 44f. Distances 46f between the separating elements 40f forming a subgroup 44f, and between the separating element 40f adjacent to the group brace 42f and the group brace 42f, determine subgroup lengths 62f. A distance between the group brace 42f and the remotest separating element 40f determines a main group length 60f. The sum of the subgroup lengths 62f forms the main group length 60f. The outer separating element 40f, in relation to the main group 14f, and the group brace 42f perform a compensating motion, so that the subgroup length 62f remains unchanged when the middle separating elements 40f are spaced.

FIG. 10 shows method steps of a separation cycle. The separating device 10f is shown in FIG. 10 in simplified representation, insofar as, for the separation of the subgroups 44f, only one separating element 40f is provided and the subgroups 44f are not spaced farther apart by the spacing of two inserted separating elements 40f. In a method step 76f, the two separating elements 40f, a product column brace 32f and the group brace 42f are in a starting position 20f, while the group brace 42f is placed against one end 58f of a product column 18f supplied in a continuous feed motion 16f. The separating elements 40f and the group brace 42f are part of a portioning unit 12f and move in the direction of the feed motion 16f synchronously with the product column 18f. The product column brace 32f waits in a separating position 90f. Once the product column 18f, measured from the separating position 90f, has moved sufficiently far in the direction of the feed motion 16f that its length corresponds to the main group length 60f, then in a method step 78f the first separating element 40f, located at the separating position 90f, is introduced into the product column 18f and thus separates the main group 14f from the product column 18f. In a method step 80f, the second separating element 40f, located at a parting position 92f, is now introduced into the main group 14f and then the two subgroups 44f formed. The group brace 42f is introduced at the end 58f of the product column 18f and now moves synchronously with the feed motion 16f and secures the end 58f of the product column 18f. In a method step 82f, the portioning unit 12f accelerates in the direction of the feed motion 16f and thus spaces the main group 14f, consisting of the two subgroups 44f, from the product column 18f. If, in a method step 84f, the portioning unit 12f reaches with the main group 14f the depositing unit (not represented in detail here), then the portioning unit 12f stops the main group 14f. In a method step 86f, the depositing unit moves the main group 14f in an evacuation motion 24f substantially transversely to the feed motion 16f into an onward transport unit (likewise not represented in detail). In a method step 88f, the portioning unit 12f moves with the two separating elements 40f and the group brace 42f back in the direction of the starting position 20f, so that in a new separation cycle the next main group 14f can be separated. As soon as the group brace 42f has come to bear against the end 58f of the product column 18f, the portioning unit 12f is moved with the feed motion 16f jointly with the product column 18f and the product column brace 32f can be withdrawn and return into the separating position 90f. Once the product column 18f, measured from the separating position 90f, has moved sufficiently far in the direction of the feed motion 16f that its length corresponds to the main group length 60f, a new separation cycle can begin and the next main group 14f can be separated.

The invention claimed is:

1. A separating device having at least one portioning unit (12a-f), which is designed to space main groups (14a-f) from at least one product column (18a-f) formed as a stack of strung, mutually touching individual products supplied in a continuous feed motion (16a-f) and to form the main groups (14a-f) from the at least one supplied product column (18a-f) by an acceleration at least substantially in a direction of the feed motion (16a-f), characterized in that the portioning unit (12a-f) returns to a starting position (20a-f) in order to form a next main group (14a-f), while the at least one supplied product column (18a-f) is supplied in a feed motion (16a-f), and characterized by at least one product column brace (32a-f), which is synchronizable with the feed motion (16a-f) and which, during at least one of spacing and evacuation of the main groups (14a-f), secures one end (58a-f) of the supplied product column (18a-f).

2. The separating device as claimed in claim 1, characterized by a depositing unit (22a-f), which evacuates the main groups (14a-f) in an evacuation motion (24a-f) having a motional component (26a-f) at least substantially transversely to the feed motion (16a-f).

3. The separating device as claimed in claim 2, characterized in that at least one of the depositing unit (22e) and the positioning unit (12e) deposits the main groups (14e) in synchronization with an onward transport motion (28e) into an onward transport unit (30e).

4. The separating device as claimed in claim 2, characterized in that the portioning unit (12a-f) at least substantially stops the main groups (14a-f) prior to the start of the evacuation motion (24a-f).

5. The separating device as claimed in claim 1, characterized by a feed unit (34a-f), which feeds the supplied product column (18a-f) in a feed direction (38a-f) which is angled downward in relation to a horizontal (36a-f).

6. The separating device as claimed in claim 1, characterized by a feed unit (34a-f), which feeds the supplied product column (18a-f) in a feed direction (38a-f) which is angled upward in relation to a horizontal (36a-f).

7. The separating device as claimed in claim 1, characterized by at least one separating element (40a-f) and a group brace (42a-f), between which at least one of the main groups (14a-f) and subgroups (44a-f) are formed.

8. The separating device as claimed in claim 7, characterized in that at least one of a main group length (60a-f) and a subgroup length (62a-f) is determined by distances (46a-f) between separating elements (40a-f) and/or between the separating element (40a-f) and the group brace (42a-f).

9. A packing machine having a separating device (10a-f) as claimed in claim 1.

10. A method for forming main groups (14a-f) from a product column (18a-f) with a separating device (10a-f) as claimed in claim 1.

11. A separating device having at least one portioning unit (12a-f), which is designed to space main groups (14a-f) from at least one product column (18a-f) supplied in a continuous feed motion (16a-f) and to form the main groups (14a-f) from the at least one supplied product column (18a-f) by an acceleration at least substantially in a direction of the feed motion (16a-f), characterized by a depositing unit (22a-f), which evacuates the main groups (14a-f) in an evacuation motion (24a-f) having a motional component (26a-f) at least substantially transversely to the feed motion (16a-f).

12. The separating device as claimed in claim 11, characterized in that at least one of the depositing unit (22e) and the positioning unit (12e) deposits the main groups (14e) in synchronization with an onward transport motion (28e) into an onward transport unit (30e).

13. The separating device as claimed in claim 11, characterized in that the portioning unit (12a-f) at least substantially stops the main groups (14a-f) prior to the start of the evacuation motion (24a-f).

14. The separating device as claimed in claim 11, characterized by at least one product column brace (32a-f), which is synchronizable with the feed motion (16a-f) and which during at least one of spacing and evacuation of the main groups (14a-f), secures one end (58a-f) of the supplied product column (18a-f).

15. The separating device as claimed in claim 11, characterized by a feed unit (34a-f), which feeds the supplied product column (18a-f) in a feed direction (38a-f) which is angled downward in relation to a horizontal (36a-f).

16. The separating device as claimed in claim 11, characterized by a feed unit (34a-f), which feeds the supplied product column (18a-f) in a feed direction (38a-f) which is angled upward in relation to a horizontal (36a-f).

17. The separating device as claimed in claim 11, characterized by at least one separating element (40a-f) and a group brace (42a-f), between which at least one of the main groups (14a-f) and subgroups (44a-f) are formed.

18. The separating device as claimed in claim 17, characterized in that at least one of a main group length (60a-f) and a subgroup length (62a-f) is determined by distances (46a-f) between separating elements (40a-f) and/or between the separating element (40a-f) and the group brace (42a-f).

19. A packing machine having a separating device (10a-f) as claimed in claim 11.

20. A method for forming main groups (14a-f) from a product column (18a-f) with a separating device (10a-f) as claimed in claim 11.

21. A separating device having at least one portioning unit (12a-f), which is designed to space main groups (14a-f) from at least one product column (18a-f) formed as a stack of strung, mutually touching individual products supplied in a continuous feed motion (16a-f) and to form the main groups (14a-f) from the at least one supplied product column (18a-f) by an acceleration at least substantially in a direction of the feed motion (16a-f), characterized in that the portioning unit (12a-f) returns to a starting position (20a-f) in order to form a next main group (14a-f), while the at least one supplied product column (18a-f) is supplied in a feed motion (16a-f), and characterized by at least one separating element (40a-f) and a group brace (42a-f), between which at least one of the main groups (14a-f) and subgroups (44a-f) are formed.

* * * * *